Patented Mar. 7, 1933

1,900,287

UNITED STATES PATENT OFFICE

ERLING JOHNSON, OF ODDA, NORWAY, ASSIGNOR TO THE FIRM ODDA SMELTEVERK A/S, OF ODDA, NORWAY

PROCESS OF PRODUCING ALUMINA AND PHOSPHORUS OR PHOSPHORIC ACID

No Drawing. Application filed April 28, 1930, Serial No. 448,182, and in Norway March 13, 1927.

I have filed an application in Norway, March 13, 1927.

As is well known phosphorus, and/or phosphoric acid, may be prepared by thermic or electrothermic heating of a mixture of phosphate rock and quartz or bauxite under suitable reducing conditions. Phosphorus is volatilized and is recovered as such or subjected to further desired treatment, while a slag is obtained which according to the composition of the initial charge may be worked upon usual cement, alumina cement or alumina.

According to the present invention the smelting of the phosphate material is carried out in presence of alumina compounds and under addition of sulphur compounds preferably sulphides of heavy metals. This process yields a fluid slag of particularly low melting point, which facilitates the smelting operation, and the obtained slag may be easily utilized for preparation of pure alumina.

The formation of a slag of low melting point and low viscosity in the molten state which is realized by introducing sulphur in the phosphate smelting is due to the fact that under such conditions the sulphur is reacting under formation of sulphides of calcium or aluminium, which compounds impart said favourable properties to the lime and alumina containing slag.

The slag is very easily tapped which is highly important for a regular furnace work, not only in an electrothermic process but perhaps still more when coal or gas-fired furnaces are used for reduction and smelting.

Suitable raw materials to be used in the new process of phosphate smelting are common phosphate rock, bauxite, pyrites and anthracite or coke. The phosphate material may advantageously contain both iron and aluminium oxides, or phosphates of iron and aluminium which under other conditions are undesired components of crude phosphates. Instead of pyrite $FeS_2$ ferrous sulphide $FeS$ may be used or sulphur may be introduced into the process in other ways as will be mentioned later on.

Beside the reactions generally taking place in phosphate smelting the following will occur in the new process: (provided ferrous sulphide is used as sulphur containing material):

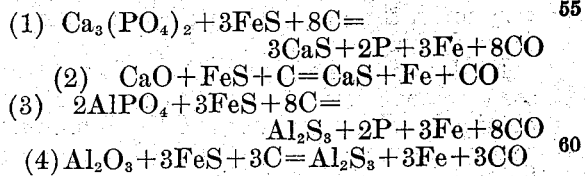

The resulting slag contains calcium aluminate, calcium sulphide and aluminium sulphide together with some impurities such as silicates, phosphides etc.

An addition of sulphur material in quantities as to give slag with 5-25 per cent sulphides, earth-alkali and aluminium sulphides, is sufficient for rendering the slag very easily fusible and fluid but of course the new process is not restricted to just these quantities of sulphur compounds.

The metallic iron resulting from the iron sulphides will form an iron bath on the bottom of the furnace, and is tapped from time to time. This iron is rather impure and may best be considered as a sort of low-grade phosphor-iron, which may be worked up separately.

The treatment of the slag for obtaining pure alumina may be effected in the usual way for instance by leaching the slag with a soda solution. It was stated, that the sulphides present do not in the least impair the preparation of pure alumina from the slag.

The following example will illustrate a modus of carrying out the process.

The charge to be smelted had the following composition:

| | Parts |
|---|---|
| Phosphate rock of 36 per cent $P_2O_5$ | 600 |
| Bauxite of 51 per cent $Al_2O_3$ | 600 |
| Pyrites of 82 per cent $FeS_2$ | 125 |
| Anthracite of 81 per cent fixed C | 200 |

The raw materials are used in pea or nut size. When smelted in an electric furnace this charge, after volatilization of the phosphorus, yielded a slag product with a content of some 40 per cent calcium oxide and calcium sulphide and some 50 per cent aluminium oxide and sulphide. The total yield of slag was about 700 parts. Besides the slag some iron was obtained with a content of phosphorus and silicon.

The slag analyzed 0.76 per cent $P_2O_5$ which corresponds to a total yield of free phosphorus of some 98 per cent. The slag is easy to tap. It is also easily crushed and under the influence of the moisture of the air it tends to crumble away into a powder. The slag is easily hydrated by water which forms calcium hydroxide and aluminium oxide.

On boiling the slag with water some sulphuretted hydrogen is liberated. Under the influence of the oxygen and moisture of the atmosphere also some sulphur is set free. This tendency of decomposition facilitates very much the preparation of pure alumina from the slag.

By leaching the slag with a solution of soda a good yield of dissolved aluminate is obtained. From this solution aluminium hydroxide is precipitated in known manner by carbonic acid, whereby the soda solution is regenerated. By simple filtration and calcination very pure aluminium oxide is immediately obtained. Previous to the leaching operation the sulphur is advantageously as much as possible removed as sulphuretted hydrogen by treating the crushed slag with water or steam. Some phosphoretted hydrogen is simultaneously driven out and may be rendered innocuous or be utilized in known manner.

In the treatment of the aluminate solution with carbonic acid also some sulphuretted hydrogen from the sodium sulphide which is formed by interaction of sodium carbonate and calcium sulphide will be driven out. The total quantity of sulphuretted hydrogen evolved may be utilized for preparing elementary sulphur or for sulphurizing the bauxite to be used which in this case should be rather high in iron. The sulphurization is carried out in known manner at an appropriate temperature for instance in a revolving furnace. Simultaneously a total or partial calcination of the bauxite or of the aluminium phosphate may be effected, which is very desirable for these as well as for the other raw materials used. When the bauxite is previously sulphurized less sulphur needs be added in the smelting operation proper.

The new process may be modified in several respects without departing from the scope of the invention.

So for instance the composition of the charge may be varied within wide limits. If a charge with a high content in aluminium oxide is smelted it may prove of advantage to extract the alumina from the slag also by means of caustic soda. In this case the caustic is advantageously added to the soda solution after the latter has reacted as far as possible. However it may also be useful to effect the extraction of the slag in two separate stages in the manner that in a first stage a soda solution and in a second stage a solution of caustic is used. Further the extraction may be effected exclusively by caustic solution, which is regenerated by precipitation of aluminium hydroxide in known manner. The content of sulphur in the slag has the effect that the latter is easily decomposed and leached even when its content of alumina is a high one.

In lieu of crude calcium phosphates, naturally occurring aluminium phosphates may be used in the process. In such case a slag is obtained, which consists of aluminium oxide and aluminium sulphide and from which pure alumina may be prepared mainly by mechanical separation.

The phosphorus resulting in the process may be recovered as such and subsequently be transformed into phosphoric acid by oxidation outside the furnace system. Or it may be immediately oxidized by blowing air into the furance system at a convenient place of the latter whereupon the phosphoric acid formed is precipitated preferably in a Cottrell apparatus.

In introducing the charge into the furnace it is serviceable to supply the carbon and sulphur material as mixed separate charge in a zone of the furnace where reducing conditions are prevailing, respectively below the zone, where the air is blown in for oxidation of the phosphorus.

The heat evolved by oxidation of the phosphorus may be utilized in known manner for preheating the raw materials. Instead of in the form of pyrites or ferrous sulphide, the sulphur may be introduced as other metal sulphides. Further, when carbon material particularly high in sulphur is used for reduction, the sulphur of such material is utilized in the process. Iron or iron ore may be added if the other raw materials are poor in iron. Such addition facilitates the furnace work and the complete disengagement of the phosphorus from the charge. Pyrites or ferrous sulphide as sulphur material may be replaced wholly or partly by earth alkali sulphates whereby eventually iron or iron ore may be added. In presence of a sufficient quantity of reductive material said sulphates will be reduced to sulfides which immediately enter into the slag.

For protection of the bottom of the furnace it is of advantage always to leave a certain portion of the metallic iron in the furnace so that the smelting and reduction of the charge takes place upon a bath of molten iron.

I claim:

1. A process of producing alumina and phosphorus, comprising smelting phosphate material and bauxite under reducing conditions in presence of materials containing iron and sulphur, in order to volatilize phosphorus and to form a slag containing aluminium compounds and sulphides, treating said slag with a leaching liquor and precipitating alumina from the solution so obtained.

2. A process of producing alumina and phosphorus, comprising smelting phosphate rock and bauxite under reducing conditions in presence of iron-sulphur-compounds in order to volatilize phosphorus and to form a slag containing sulphides and aluminium compounds and a bath of molten iron treating said slag with a leaching liquor and precipitating alumina from the solution so obtained.

3. A process of producing alumina, phosphorus, and a by-product of iron comprising smelting phosphate rock and bauxite under reducing conditions in presence of iron-sulphur-compounds in order to volatilize phosphorus and to obtain a bath of molten iron and a slag containing from 5 to 35 per cent sulphides of aluminium and calcium, treating said slag with a leaching liquor and precipitating alumina from the solution so obtained.

4. A process of producing alumina, phosphorus, and a by-product of iron comprising smelting phosphate rock and bauxite under reducing conditions in presence of materials containing iron and sulphur in order to volatilize phosphorus and to obtain a slag containing from 30 to 95 per cent aluminium oxide and aluminium sulphide, treating the slag with a leaching liquor and precipitating alumina from the solution.

5. A process of producing alumina and phosphorus, comprising smelting phosphate material and bauxite under reducing conditions in presence of earth alkali sulphates and iron containing material in order to volatilize phosphorus and to form a slag containing aluminium compounds and sulphides, treating the slag with a leaching liquor and precipitating alumina from the solution.

6. A process of producing alumina and phosphorus, comprising smelting upon a permanent bath of molten iron a charge of phosphate material and bauxite under reducing conditions and in presence of materials containing iron and sulphur in order to volatilize phosphorus and to form a slag containing aluminium compounds and sulphides, treating the slag with a leaching liquor and precipitating alumina from the solution.

7. A process of producing alumina and phosphorus, comprising smelting phosphate material and bauxite under reducing conditions in presence of materials containing iron and sulphur in order to volatilize phosphorus and to form a slag containing aluminium compounds and sulphides, leaching said slag with a soda solution and precipitating alumina from the liquor so obtained.

8. A process of producing alumina and phosphorus, comprising smelting phosphate material and bauxite under reducing conditions in presence of materials containing iron and sulphur in order to volatilize phosphorus and to form a slag containing aluminium compounds and sulphides, leaching said slag with a caustic soda solution and precipitating alumina from the liquor so obtained.

9. A process of producing alumina and phosphorus which comprises the steps of subjecting bauxite to sulphurization, smelting the sulphurized bauxite and a phosphate material under reducing conditions in the presence of materials containing iron and sulphur in order to volatilize phosphorus and to form a slag containing aluminium compounds and sulphides, treating the slag with a leaching liquor and precipitating alumina from the solution.

10. A process of producing alumina and phosphorus which comprises the steps of sulphurizing bauxite by means of sulphuretted hydrogen, smelting the sulphurized bauxite and a phosphate material under reducing conditions in the presence of materials containing iron and sulphur in order to volatilize phosphorus and to form a slag containing aluminium compounds and sulphides, treating the slag with a leaching liquor and precipitating alumina from the solution.

In testimony that I claim the foregoing as my invention I have signed my name.

ERLING JOHNSON.